United States Patent
L'Hote et al.

(10) Patent No.: US 7,113,928 B1
(45) Date of Patent: Sep. 26, 2006

(54) FRANKING MACHINE AND OPERATING METHOD THEREOF

(75) Inventors: Frédéric L'Hote, Paris (FR); Jean-Luc Joblin, Conflans Sainte Honorine (FR)

(73) Assignee: SECAP (Groupe Pitney Bowes) S.A.S., Saint Denis laPlaine (FR)

( * ) Notice: Subject to any disclaimer, the term of this patent is extended or adjusted under 35 U.S.C. 154(b) by 0 days.

(21) Appl. No.: 09/959,693

(22) PCT Filed: Mar. 17, 2000

(86) PCT No.: PCT/FR00/00660

§ 371 (c)(1),
(2), (4) Date: Jan. 16, 2002

(87) PCT Pub. No.: WO00/68895

PCT Pub. Date: Nov. 16, 2000

(30) Foreign Application Priority Data

May 5, 1999 (FR) .................................. 99 05705

(51) Int. Cl.
*G06Q 99/00* (2006.01)
*H04L 9/00* (2006.01)

(52) U.S. Cl. ............................ 705/60; 705/1; 705/62; 705/401; 705/404; 705/408; 705/410; 380/23; 380/24

(58) Field of Classification Search ............ 705/1, 705/60, 62, 401, 404, 408, 410; 380/23, 380/24
See application file for complete search history.

(56) References Cited

U.S. PATENT DOCUMENTS

| | | | | |
|---|---|---|---|---|
| 5,781,634 A | * | 7/1998 | Cordery et al. | 705/60 |
| 6,151,590 A | * | 11/2000 | Cordery et al. | 705/60 |
| 6,285,990 B1 | * | 9/2001 | Lee et al. | 705/60 |
| 6,592,027 B1 | * | 7/2003 | Kovlakas | 235/375 |
| 2001/0042052 A1 | * | 11/2001 | Leon | 705/401 |

FOREIGN PATENT DOCUMENTS

JP    11296711 A  *  10/1999

OTHER PUBLICATIONS

39 CFR ch1. (Jul. 1, 2003 Edition ) author unknown, Jul. 1, 2003.*

* cited by examiner

*Primary Examiner*—James Trammell
*Assistant Examiner*—John M. Winter
(74) *Attorney, Agent, or Firm*—George M. Macdonald; Steven J. Shapiro; Angelo N. Chaclas (57) ABSTRACT

The invention concerns an electronic franking machine comprising franking means and means for recording the number of franking operations. It comprises means for connection via a computerized communication network, to a central server of a computerized central control center, and means forming a computerized server adapted to transmit and receive computerized requests and responses for performing transactions with the central server, said transactions being selected among at least a resetting of the means recording the franking operations, a transfer of files constituting the records of the recording means and a franking cycle.

43 Claims, 6 Drawing Sheets

FRANKING MACHINE AND OPERATING METHOD THEREOF

FIELD OF THE INVENTION

The present invention relates to an electronic franking machine.

It also relates to a method of performing transactions between this franking machine and a computerized control center.

BACKGROUND

Typically, franking machines comprise franking means making it possible to apply a franking mark to a item of mall.

Means for control and management of these franking means make it possible to calculate the franking value and to create the mark applied to the item of mail.

Such machines also comprise means for accounting for the franking operations. Generally, they comprise a so-called ascending register, of which the value is increased, each time a franking mark is printed, by the amount of the value of that franking operation, and/or a so-called descending register, of which the value is decreased by that same franking value.

The so-called ascending register thus represents the total value of the franks printed by the machine since it was put into service whereas the so-called descending register indicates the available credit not yet used up since the last re-crediting of the machine in monetary units.

For the operation of such machines, it is necessary to re-credit the so-called descending register periodically. It is moreover useful to make readings of the registers or produce various statistics on the franking operations performed by the machine.

Systems are known which enable re-crediting information to be transmitted to a franking machine, by virtue of a memory card of chip card type, which is transported between the computerized control center and the franking machine. Such a system is described for example in the patent application FR 94 10530 in the name of the present applicant.

However, to obtain a register re-crediting instruction, the user must make a request to the control center, which creates the card storing the re-crediting instructions and then sends it to the user.

Such a system has the drawback of being long to implement as well as using a card which passes between the center and the site on which the franking machine is used.

In order to speed up the re-crediting operation, a data communications terminal can be used on the user's site, this terminal being linked to the control center by means of a modem, the communication passing via the public telephone network. Each memory card, respectively associated with a franking machine, may be inserted in the terminal, and re-crediting data, sent by the center, are written on the memory card. This card is next installed in conventional manner in the associated franking machine.

However, even in this improved system, the memory card is periodically extracted from the franking machine. It must consequently have significant guarantees for avoiding any fraud on the data written on that card.

SUMMARY

The object of the present invention is to provide a franking machine and a method for performing transactions between the control center and the franking machine, which enable in particular these transactions to be performed in a rapid and secure manner.

To that end, the electronic franking machine comprises franking means and franking operation accounting means.

According to the invention, this franking machine comprises means for connection, via a computer communication network, to a central server of a computerized control center, and computer server forming means adapted to transmit and receive computer requests and responses for performing transactions with the central server, the transactions being chosen among at least one re-crediting of the franking operation accounting means, a transfer of files forming the readings of the accounting means and a franking cycle.

By virtue of the invention, the franking machine may be assimilated to a computer terminal which can directly exchange information with a central server of the control centers for example by a communication network of the Internet type.

By using a communication protocol, for example the Hyper Text Transfer Protocol (or HTTP) defined for the communication network used, information can be easily transferred from the franking machine to the central server and vice-versa.

It is no longer necessary to use a portable object of the removable memory card type in order to perform operations of re-crediting or analysis of the machine.

Furthermore, the connection of the franking machine to the central server by a computer network possibility allows an authorization to be required from the center for each franking cycle and no longer for an overall franking value stored on the machine in the so-called descending register, then spent progressively with successive franking cycles.

According to a preferred feature of the invention, the computer server forming means comprise as many distinct computer servers as types of transactions to be made between said machine and the central server.

Thus the computer servers are dedicated to a single operation such that a specific authorization can be granted to each server of the franking machine by the central server for the carrying out of a transaction.

In practice, several servers may be physically incorporated in the franking machine or else a main server may be organized into sub-servers each having a specific function.

According to a preferred feature of the inventions the franking machine comprises means for calculation of inspection data adapted to authenticate the status of the accounting means.

These inspection data enable the certification of the authentication of the machine at the central server and to verify the integrity of the different registers.

In practice, the inspection data calculation means are adapted to produce a ciphertext from data of the accounting means and a digital secret key associated with a calculation algorithm.

The digital key, which may be initialized in the factory, makes it possible to sign the inspection data transmitted.

It may be dynamic and be modified over the course of time, for example at each new transaction.

According to another aspect of the invention, a method of performing a transaction between a franking machine in accordance with the invention and a central server of a computerized control center, implemented on said franking machine, comprises the following steps:

connecting the franking machine with said central server;
transferring an identifier;
disabling said franking machine;

transferring a transaction code;
performing said transaction; and
enabling said franking machine.

Before any transaction between the central server and the franking machine, disabling of the latter makes it possible to block the use of the machine and to prevent any attempts at intrusion for pirating the system so long as the transaction initialized has not been carried out correctly.

The transfer of a transaction code makes it possible to authenticate with the central server the operation which must be requested at the franking machine.

Thus, the performance of a transaction requires the reception of a specific authorization from the central server.

According to a preferred feature of the invention, this method further comprises a step of transferring inspection data adapted to authenticate the status of the accounting means of the machine.

This step enables the central server to verify the integrity of the data and to detect any fraud or malfunction of the franking machine.

Preferably, this method of performing a transaction comprises two steps of transferring inspection data, one before and the other after the transaction has been made, which makes it possible to perform the transaction only if the integrity of the different registers is verified and to check that the different parameters transmitted at the time of the transaction have been correctly stored in memory.

According to an analog and symmetrical aspect of the invention, a method of performing a transaction between a franking machine in accordance with the invention and a central server of a computerized control center, implemented on the central server, comprises the following steps:

identifying the franking machine;
performing said transaction;
transferring a re-crediting code for enabling the machine; and
disconnecting the central server from the franking machine.

This method of performing a transaction implemented on the central server has advantages and preferred features that are symmetrical with those described previously for the method of performing a transaction implemented on the franking machine.

The present invention also relates to a computer communication network comprising at least one franking machine according to the invention and one central server of a computerized control center.

This communication network makes it possible to connect, in real time, a franking machine to a computerized control center so as to permit a certain number of transactions to be made remotely, such as re-crediting of registers, reading of registers, performing a franking cycle or other transactions.

Still other advantages and particular features of the invention will appear in the following description.

In the accompanying drawings, given by way of non-limiting example.

BRIEF DESCRIPTION OF THE DRAWINGS

DETAILED DESCRIPTION OF THE EMBODIMENTS

Figure 1:
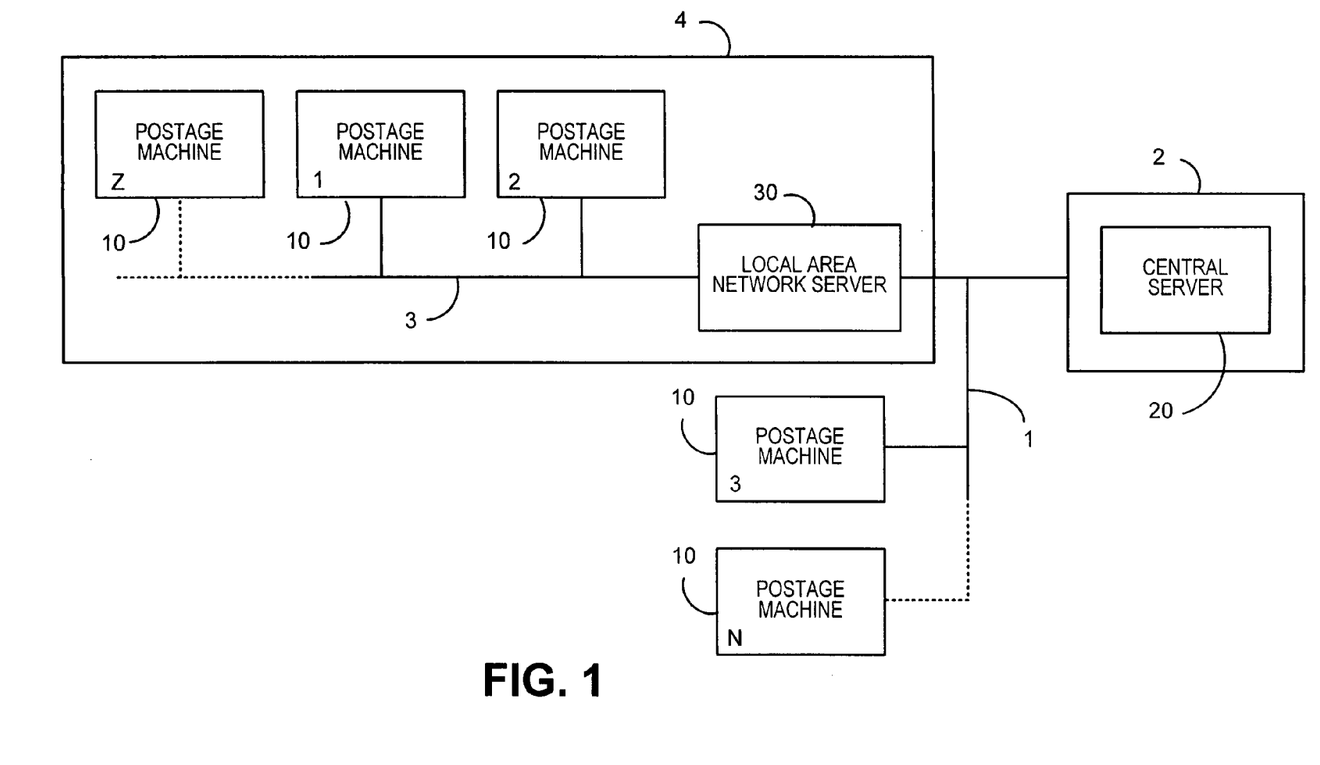
FIG. 1 is a block diagram showing a communication network according to an embodiment of the invention.

FIG. 1 shows a computer communication network 1 which comprises several franking machines 10 which are connected by the network 1 to a central server 20 of a computerized control center 2.

Certain franking machines 10, numbered 3, . . . , N, may be directly connected to the communication network 1.

Alternatively, several franking machines 10, numbered 1, 2, . . . , may be connected to a local computer communication network 3, this local network 3 being connected to the central server 20 by an intermediate local server 30.

Such a configuration is particularly well adapted when several franking machines 10 are present on the same site 4, for example within a company, the franking machines 10 being connected to the local network of the company, of Ethernet network type.

The central server 20 and the server 30 of the local network 4 are typically computers comprising a microprocessor, a read-only memory adapted to record programs for communicating via the communication networks 1, 3 with different servers of these networks and a random access memory which records the variables modified during the execution of these programs.

Figure 2:
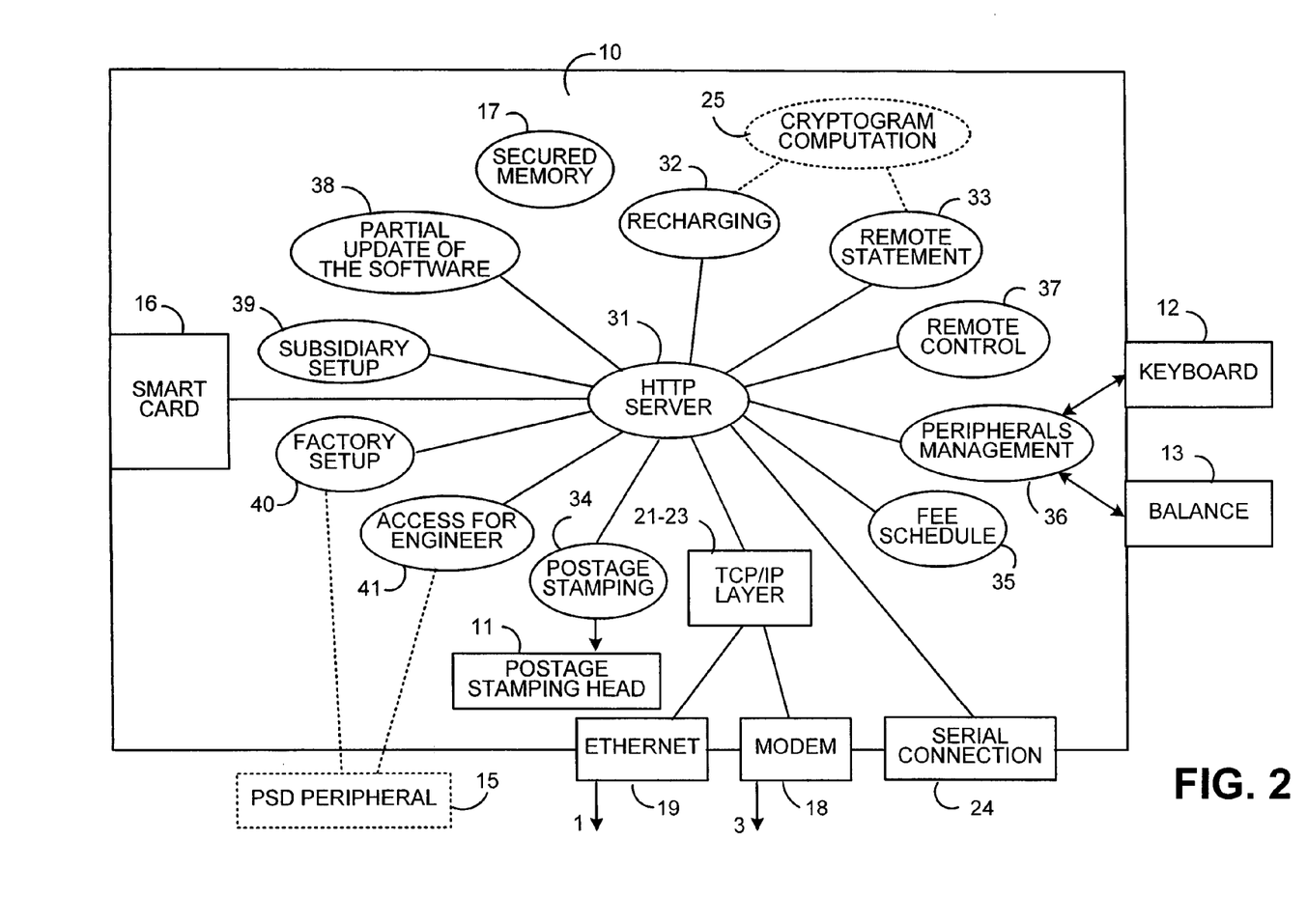
FIG. 2 is a diagram showing a franking machine according to an embodiment of the invention.

The franking machines 10 typically comprise, as illustrated diagrammatically in FIG. 2, franking means 11 which comprise for example a printing head situated above a guide plate for the object on which the franking mark must be applied.

The machine 10 may further comprise as peripherals a keyboard 12 enabling the user to enter certain parameters necessary for the franking operation and scales 13 for weighing objects to be franked.

Means for electronic management and control are generally adapted to control the franking means 11 by means of internal electronic circuits driven by a microcontroller provided with a software application for managing the franking operations.

The franking machine 10 further comprises means 17 for accounting for the franking operations. Typically, two regions are integrated into the franking machine, an ascending register accumulating the franking values delivered by the machine since it since it was put into service and a descending register debited at each franking operation.

It is easily understood that this register must be periodically re-credited and that a franking operation by the machine is only made possible if its value is not greater than the value stored in the descending register.

These registers are preferably stored on an memory card internal of the franking machine 10 which thus forms a secure memory 17. This secure memory 17 could be integrated into other forms of carrier, such as for example an OTP (One-time Programmable) microprocessor.

By way of variant, illustrated in dotted lines in FIG. 2, these registers 17 could be housed in a Postal Security Device (or PSD) 15, as a peripheral of the actual franking machine 10.

As described below with reference to the operation of this franking machine 10, the secure memory 17 makes it possible to store in memory re-crediting codes of the machine 10, a set of digital keys and an algorithm for calculation of a ciphertext from data from the accounting means 17 and from a digital key.

These stored data may be transferred at least in part at an initialization phase of the franking machine from a chip card 16 to the secure memory 17 integrated in the franking machine 10.

As will be better understood in the description below of the operation of the franking machine 10, a set of re-crediting codes is also stored in memory, these re-crediting codes being adapted to enable the machine when a valid re-crediting code is transferred by the central server.

The format of the chip cards 16 or 17 conforms to the ISO standard. They are equipped with a microcircuit of the random access non-volatile memory type, re-writable, of EEPROM or equivalent type.

According to the invention, the franking machine 10 comprises means 18, 19 for connection, via the computer communication network 1, to the central server 20 of the computerized control center 2.

Figure 3:
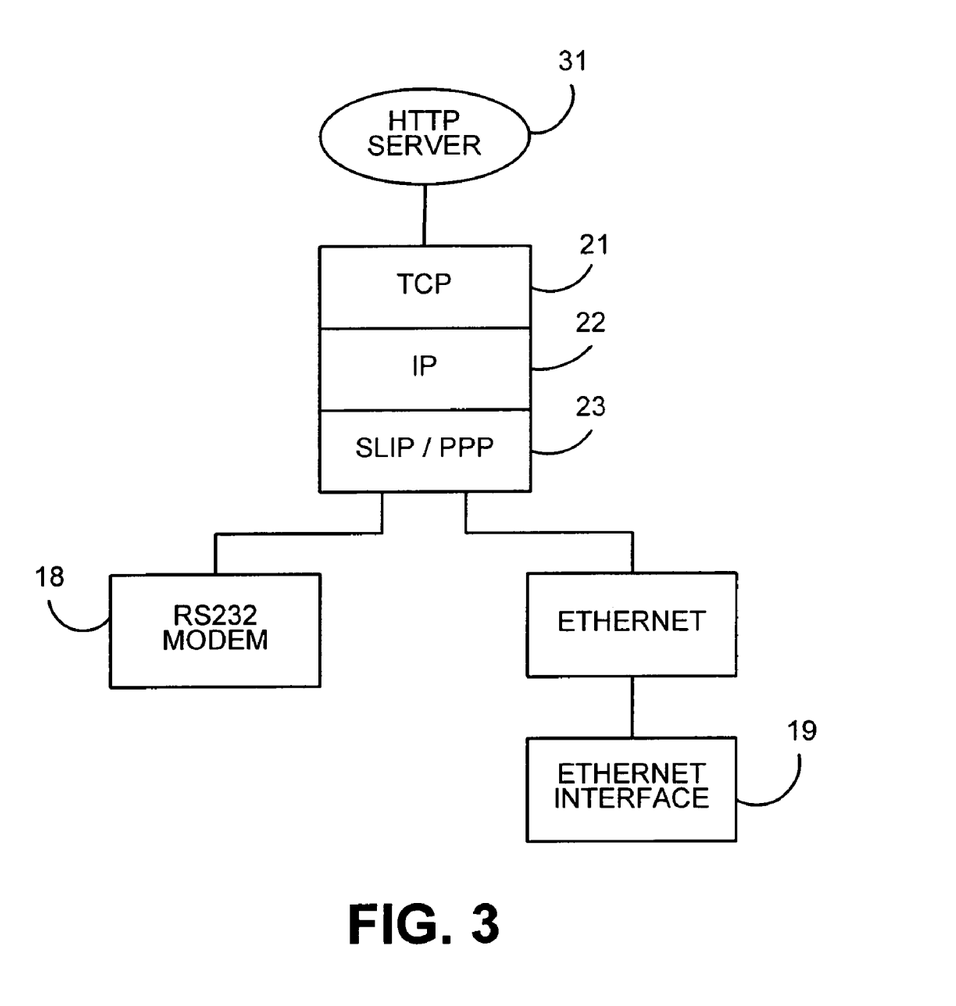
FIG. 3 is a diagram showing the different layers of the connection of a franking machine with a computerized control center.

As is best illustrated in FIG. 3, a stack of TCP/IP protocols is implemented in the franking machine 10, which enables access to known means such as Internet or Ethernet using the standard connections 18, 19.

In known manner, this computer network model comprises a so-called TCP (Transmission Control Protocol) transport layer 21 above the so-called IP (Internet Protocol) network or Internet layer 22.

A link layer 23, of SLIP (Serial Line Internet Protocol) or PPP (Point-to-Point Protocol) type is situated above the physical layer enabling actual connection of the machine 10 to the communication network 1.

This physical layer comprises either an Ethernet interference 19 when the machine 10 is connected to a local network 3, or a connection of the type RS 232 18 in the EIA (Electronic Industries Association) standard which makes it possible to connect the franking machine 10 directly to the network 1 via a modem.

This TCP/IP protocol is well known to the person skilled in the art of computer communication networks and does not need to be described in detail here.

This TCP/IP protocol thus makes it possible to access communication networks in a standardized manner, in particular the Internet network. This protocol is integrated with a real-time kernel and its activation in the machine is set up on launching the real-time kernel.

It may be advantageous to provide the franking machine 10 with a serial layer 24, in particular for maintenance operations which must be performed before the machine 10 has launched the real-time kernel and thus the TCP/IP protocol.

This serial layer 24 may use a connector through the intermediary of which access is given to the internal circuits of the machine 10, it being possible to context this connector to a computer of the center 2 in order to perform an initialization operation. When normal use is made of the machine, access is obtained through the intermediary of the TCP/IP layer, it being possible to mask the connector of the serial layer 24 by a tamper-proof protection envelope.

The use of the TCP/IP protocol enables the implementation in the machine 10 of computer server forming means 31 adapted to transmit and receive computer requests and responses for performing transactions with the central server 20 via the communication network 1.

An HTTP central server 31 can thus be implemented with specific functions for the different operations performed by the machine 10.

These operations or transactions performed by the machine 10 may be chosen in non-limiting manner from among:

a re-crediting 32 of the means 17 for accounting for the franking operations, and in particular the re-crediting of the descending register;

a file transfer forming the readings 33 of the accounting means in order to check the status of the registers 17 or to produce statistics on the type of franking operations performed by the machine 10, a franking cycle 34 making it possible to calculate and create the franking mark to be applied using a software application for calculation and control of the franking operations.

possibly the updating 35 of a database containing the applicable tariffs.

the management of peripherals 36, such as the keyboard 12 or the scales 13, the remote control 37 of the machine 10 via a computer, an update 38, generally partial, of the software application for calculation and control of the franking operations.

possibly a modification of the subsidiary configuration 39 for modifying parameters relating to the user which have been introduced at the initialization phase of the machine 10.

possibility a modification of the factory configuration 40 for modifying parameters for identification of the machine which have also been introduced at the initialization phase of the machine 10, and a modification of the technician access 41 for authorizing or not access to the machine, in particular for periodic maintenance operations.

Naturally, other types of requests and transactions can be provided for in the franking machine 10.

The HTTP computer server 31 thus comprises as many distinct computer sub-servers 32 to 41 as types of transactions to be performed between the machine 10 and the central server 20.

The access to all or certain of these functions can be combined with transaction codes which authorize access to one or other of the servers 31~41.

Methods of signing using ciphertexts may also be used to guarantee the integrity of the transactions performed.

Thus the franking machine 10 may comprise means for calculation of inspection data 25 adapted to authenticate the status of the accounting means 17.

These inspection data calculation means 25 are adapted to produce a ciphertext calculated from data stored in the accounting means 17 and from one of the digital keys associated with the calculation algorithm.

There will now be described, according to a second aspect of the invention, a method of performing a transaction implemented by a franking machine 10 as described above and a central server 20, the franking machine 10 and the central server 20 being connected by the Internet communication network 1.

Figure 4:
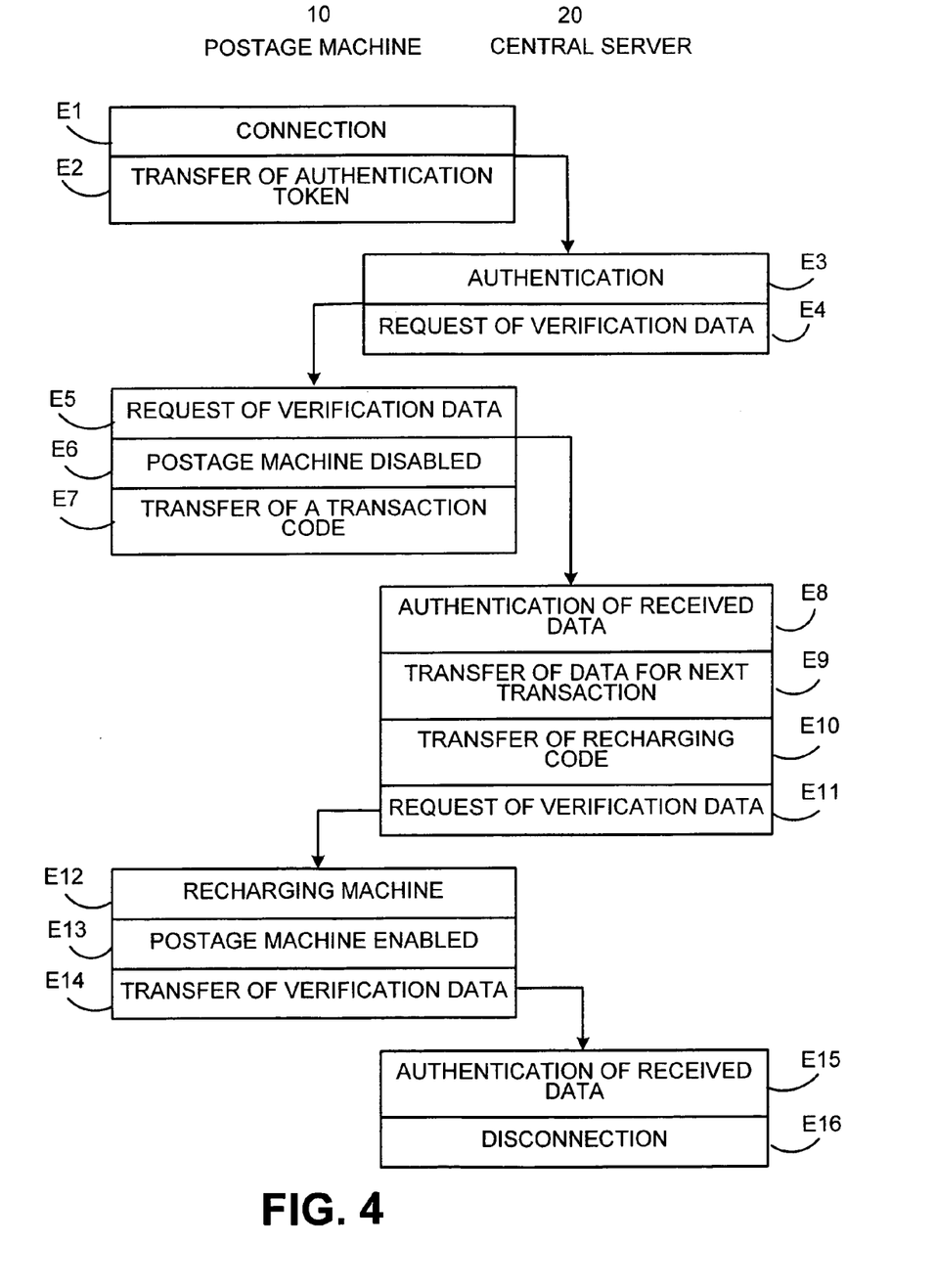
FIGS. 4, 5 and 6 are graphs showing the method of performing a transaction according to an embodiment of the invention, respectively for a register re-crediting operation, a register reading operation and a franking cycle.
Figure 5:
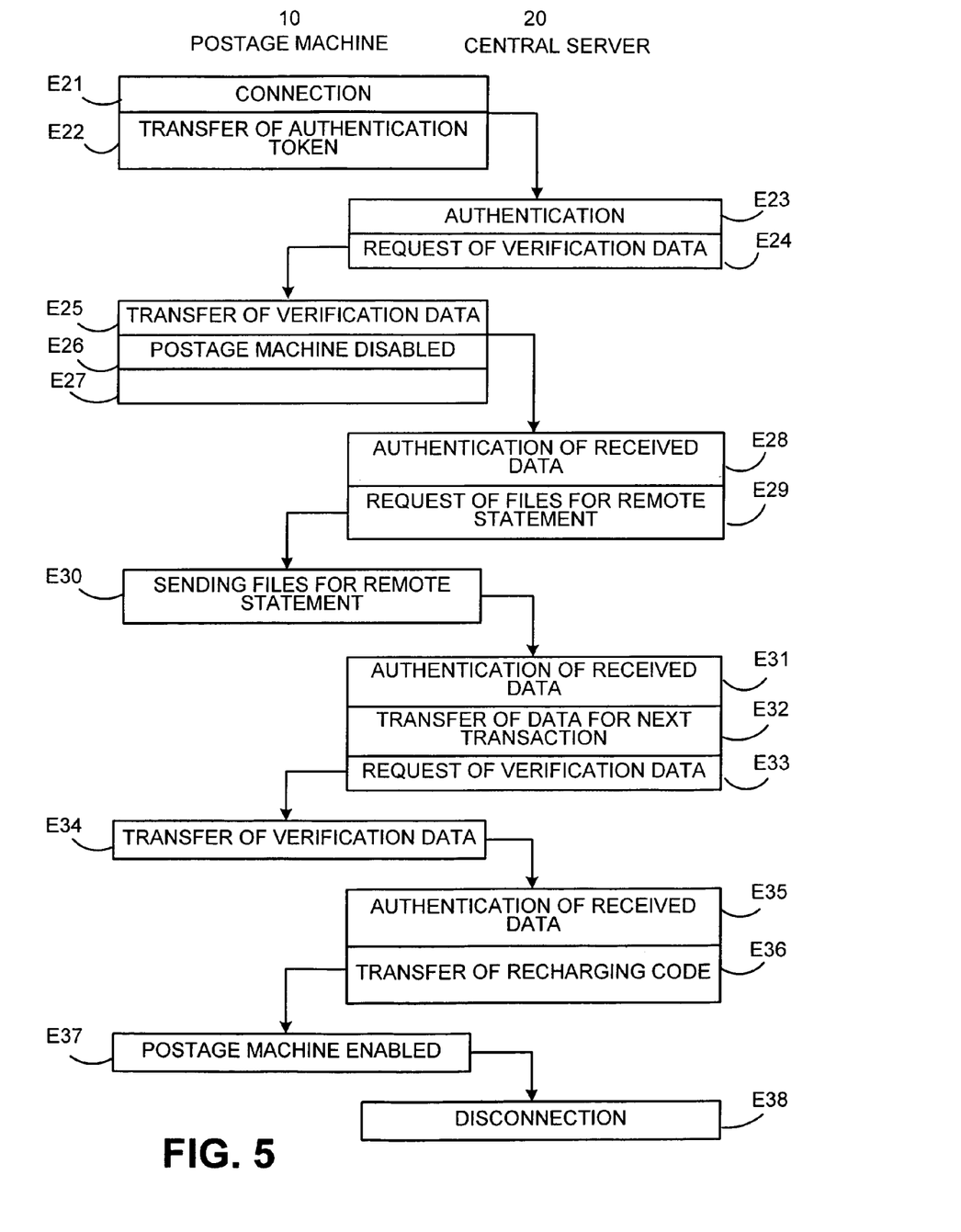
Figure 6:
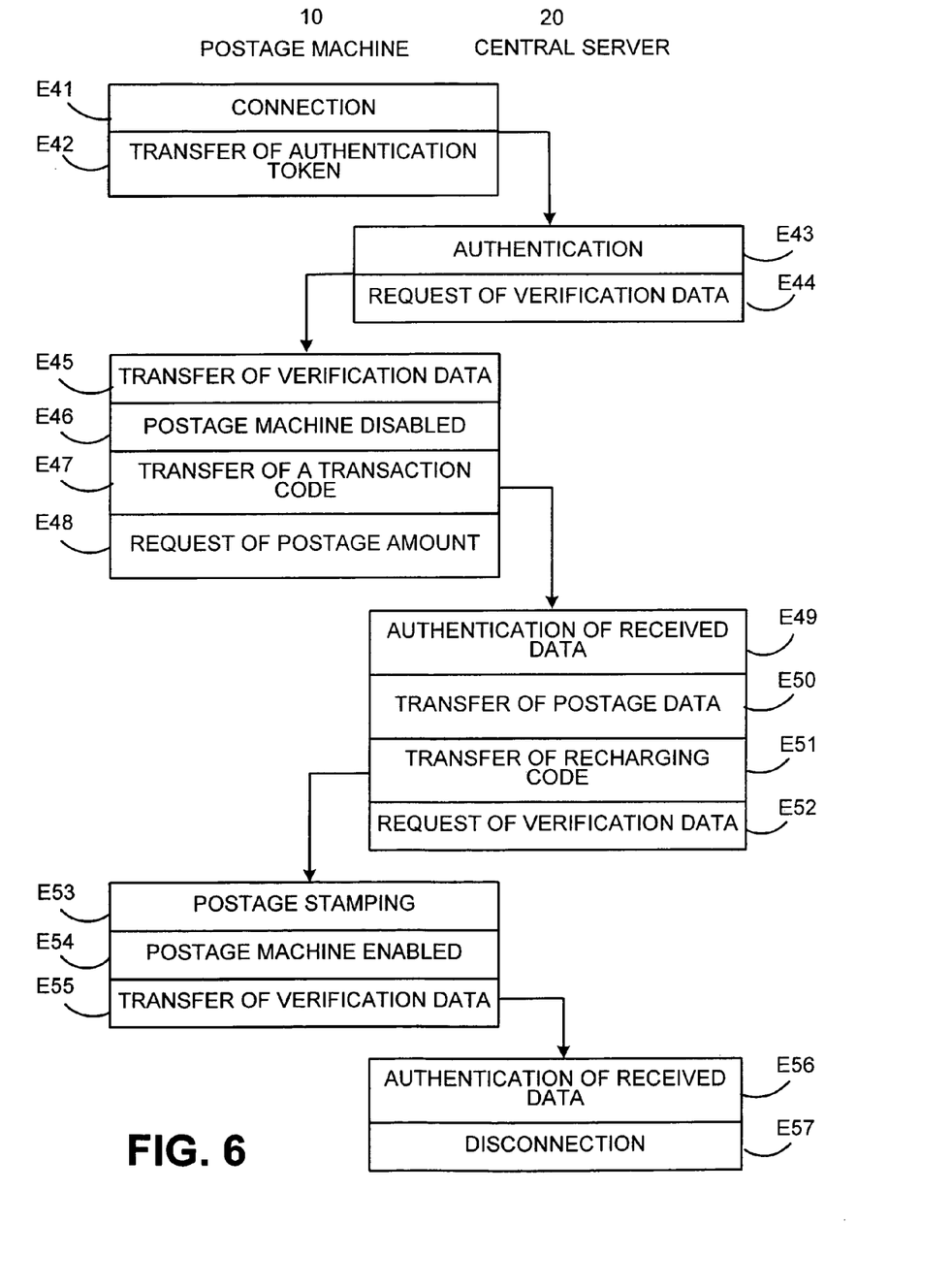

Generally, and as illustrated in FIGS. 4, 5, and 6, in order to perform a transaction, the method comprises first of all a step S1, S21, S41 of connecting the franking machine 10 with the central server 20.

In practice, the machine goes into communication mode first of all, then calls the central server via the computer network 1.

A step S2, S22, S42 of transferring an identifier makes it possible to address to the server 20, an item of information enabling the identification of the machine 10 among all the franking machines able to communicate with the central server 20 via the computer communication network 1.

This identifier may be, by way of non-limiting example, a body number or machine number determined in the factory.

For the central server 20 the method then comprises a step 83, S23, S43 of identifying the franking machine 10, by comparing the identifier transmitted with the identifiers stored in memory on the central server 20.

If the franking machine is correctly identified by the central server 20 as belonging to the set of machines 10 which are managed by the computerized control center 2, an inspection data request step S4, S24, S44 is implemented destined for the franking machine 40.

Symmetrically, an inspection data transfer step S5, S25, S45 is then implemented on the franking machine, for authenticating the status of the accounting means 17 of the machine 10.

A ciphertext is thus calculated by means of an algorithm using a secret key and data from the registers 17.

The calculation of the ciphertext is performed by the machine from, for example, an algorithm of DES type.

The secret key and the ciphertext are next transferred to the central server 20.

This transfer step is followed by a step S6, S26, S46 of disabling the franking machine which locks itself, so barring its use as long as the transaction initialized has not has not taken place correctly.

The locking of the machine 10 can be performed in different ways.

In practice, for example when it is desired to re-credit the descending register, its value is transferred into a temporary register and the actual descending register of the franking machine 10 is set to zero, so disabling the machine.

The machine is credited by adding a sum of money into the temporary register.

Once the transaction has been correctly performed, the enabling of the machine is achieved by transferring the value of the temporary register into the descending register of the machine.

A step S7, S27, S47 of transferring a transaction code is then implemented on the franking machine 10 for authenticating the requested transaction.

This transaction may either be a request for re-crediting the means 17 for accounting for the franking operations (FIG. 4), that is to say the descending register, or a request for remote reading (FIG. 5) when the transaction required is a transfer of files forming readings of the accounting means 17, or a franking request (FIG. 6), for example for a certain number of items of mail to be franked with a given value, when the transaction required is a franking cycle.

Naturally, other types of transaction may be envisaged.

In the particular case of FIG. 6, at the time of a franking request, the method further comprises a step S48 of requesting a franking sum, for example entered by the user by means of the keyboard 12 of the franking machine 10.

The method next comprises a step S8, S28, S49 at the central server 20 of verifying the ciphertext received. In practice, the ciphertext is recalculated from the data received and from the digital key, then the central server 20 checks that the ciphertext calculated is identical to the ciphertext transferred by the machine 10 in order to authenticate the status of the accounting means 17 of the machine 10 if the two ciphertexts are identical.

If this is the case, the actual transaction can be made.

Thus, as illustrated in FIG. 4, when the transaction is a re-crediting of the descending register, a re-crediting code is transferred at a transfer step S10. The re-crediting code is chosen from a list of codes pre-recorded both at the central server 20 and in secure memory 17 of the machine 10, this re-crediting code being associated with a re-crediting value of the register.

This manner of proceeding avoids any transfer of monetary value over the computer network for the re-crediting of the register. Reference may usefully be made to patent application FR 94 10530 in the name of the present applicant for details relating to the re-crediting of a descending register from prerecorded re-crediting codes.

When the transaction is a reading of the registers, as shown in FIG. 57 the central server formulates a request for asking for transfer at a step S29 of the files to be remotely read.

If the transaction directly concerns the execution of a franking cycle, as shown in FIG. 6, the central server 20 addresses the franking information at a transfer step S50, which will enable the machine to compose the franking mark to be applied to each of the items of mail.

Note that before any transaction, the calculation and the verification of the ciphertext by the franking machine 10 and the central server 20 enables prior verification of the integrity of the registers 14 of the machine 10.

If the ciphertexts do not match, the transaction is interrupted.

As shown in FIGS. 4 and 5, the method may further comprise a step S9, S32 of transferring data of a following transaction, such as for example a new digital key for the calculation of the algorithm for authentication of the registers.

As shown in FIG. 4, this step S9 of transferring data for a following transaction may be implemented before the transaction is performed, or alternatively, after performing the transaction, as shown in FIG. 5.

The transaction is then performed on the franking machine.

As FIG. 4 shows, the descending register is re-credited at a re-crediting step S12 from the re-crediting code received, as a function of a value pre-recorded in relation to this code in the secure memory.

At the time of a remote reading, shown in FIG. 5, the files containing the data of the register 17 are transmitted to the central server 20 at a transfer step S30.

Due to the utilization of an HTTP server 31 on the machine, the remotely read files may be directly written and transferred in HyperText Markup Language (HTML).

A step S31 of verifying data received is furthermore implemented on the central server 20 to verify that the remote reading has been correctly made.

At the time of a franking cycle, the information transmitted by the server enable, as illustrated in FIG. 6, the franking of one or several items of mail at a franking step S53 by applying a franking mark created in the usual way based on a certain number of parameters (destination, weight of the item of mail, contact details of the sender, registered mail, . . . ).

This franking operation is also accompanied by an incrementation of the ascending register and by a decrementation of the descending register by the franking value corresponding to the franking cycle executed.

After the transaction has been made, the method further comprises new step S11, S14, S33, S34, S52, S55 of requesting and transferring inspection data for authenticating the status of the accounting means 17 of the machine 10 once the transaction has been made.

This authentication is particularly important on re-crediting the register or for a franking cycle and may possibly be omitted when the registers have not been modified a priori by the transaction, as is the case for a remote reading.

Symmetrically, on the server 20, a step S15, S35, S56 of verifying data received is implemented for receiving and verifying the ciphertext associated with the digital key used for its calculation.

The verification of the ciphertext is adapted to authenticate the status of the accounting means once the once the transaction has been made by the franking machine.

This verification step is implemented in the same way as the verification step S8, S28, S49 already described.

Once the transaction has been made, the franking machine 10 is unlocked in an enabling step S13, S37, S54.

This enabling is authorized when, a valid re-crediting code is transmitted by the central server 20 to the machine 10.

In practice, the machine can store a set of re-crediting codes, possibly sorted, in memory. When a re-crediting code is received, the franking machine verifies that this code forms part of the set of codes stored in memory, and possibly, that it is identical to a code predetermined in the order of going through the set of codes stored in memory.

When the transaction is a re-crediting of the registers as shown in FIG. 4, the re-crediting code transferred at a transfer step S10 makes it possible to enable the machine 10.

Otherwise, a specific step S36, S51 of transferring a re-crediting code is implemented on the central server 20.

This change of re-crediting code at each transaction with the central server 20 makes it possible to reinforce the security of access to the central server 20 via the communication network 1 in order to avoid franking machines 10 connecting themselves without authorization to this server 20.

A last step S16, S38, S57 makes it possible to disconnect the franking machine 10 from the communication network 1 by terminating the communication mode.

This method according to the invention thus makes it possible to perform diverse transactions between a central server 20 and a franking machine without requiring any material transfer from one to the other.

In a preferred embodiment of the invention, in which a franking cycle as illustrated in FIG. 6 is implemented, the machine 10 must systematically request authorization at the central server 20 in order to frank.

The information transmitted by the central server 20 for the franking cycle may possibly comprise a re-crediting indication of the descending register, of a value just equal to the value necessary for performing the franking cycle. Once the latter has terminated, the descending register recovers its initial value, for example a nil value.

The central server 20 manages the accounting of the machine, the latter no longer directly managing money.

It has registers for guaranteeing the security of the system overall, these registers being used at the time of the authentication of the machine 10 by the central server 20 of the control center 2.

Naturally, numerous modifications can be made to the example described above without leaving the scope of the invention.

Thus other transactions may be made on the communication network 1 between the machine 10 and the central server 20, for example to update tariffs or the software application for calculation of the franking mark. The procedures for authentication and signature as previously described can also be used at the time of these transactions in order to authenticate the franking machine 10 which requires the transaction.

The invention claimed is:

1. An electronic franking machine comprising franking means and means for accounting for the franking operations, wherein it comprises means for connection, via a computer communication network, to a central server of a computerized control center, and computer server forming means adapted to transmit and receive computer requests and responses for performing transactions with the central server, said transactions being chosen among at least one re-crediting of the franking operation accounting means, a transfer of files forming the readings of the accounting means and a franking cycle and wherein the means for accounting for franking operations includes a descending resister and wherein the electronic franking machine is disabled from franking operations during the transaction by temporarily setting the value of the descending register to zero.

2. A franking machine according to claim 1, wherein the computer server forming means comprise as many distinct computer servers as types of transactions to be made between said machine and the central server.

3. A franking machine according to claim 1, wherein it comprises means for calculation of inspection data adapted to authenticate the status of the accounting means.

4. A franking machine according to claim 3, wherein the inspection data calculation means are adapted to produce a ciphertext from data of the accounting means and a digital secret key associated with a calculation algorithm.

5. A franking machine according to claim 4, wherein it comprises a secure internal memory adapted to memorize said digital key and said calculation algorithm.

6. A franking machine as claimed in claim 1, wherein it is adapted to store in memory a set of re-crediting codes which are adapted to enable said machine when a valid re-crediting code is transferred by the central server.

7. A method of performing a transaction between a franking machine according to claim 1 and a central server of a computerized control center, implemented on said franking machine, wherein it comprises the following steps:
connecting the franking machine with said central server;
transferring identifier;
disabling said franking machine;
transferring a transaction code;
performing said transaction; and
enabling the franking machine.

8. A method according to claim 7, wherein it further comprises a step of transferring inspection data adapted to authenticate the status of accounting means of said machine.

9. A method according to claim 8, wherein the inspection data are calculated by means of a digital secret key associated with an algorithm that is adapted to produce a ciphertext from data of the accounting means and said digital key.

10. A method according to claim 8, wherein it comprises two steps of transferring inspection data, one before and the other after the transaction has been made.

11. A method according to claim 7, wherein said transaction is chosen among at least one re-crediting of the franking operation accounting means, a transfer of files forming the readings of the accounting means and a franking cycle.

12. A method of performing a transaction between a franking machine according to claim 1 and a central server of a computerized control center, implemented on the central server, wherein it comprises the following steps:

identification;
performing said transaction;
transferring a re-crediting code for enabling the machine; and
disconnecting the central server from the franking machine.

13. A method according to claim 12, wherein it further comprises a step of requesting inspection data and a step of verifying received data adapted to authenticate the status of the accounting means of said franking machine.

14. A method according to claims 13, wherein it comprises two groups of steps of requesting and verifying inspection data, one group before and the other group after the transaction has been made.

15. A method according to claim 12, wherein said transaction is chosen among at least one re-crediting of the franking operation accounting means, a transfer of files forming the readings of the accounting means and a franking cycle.

16. A computer communication network, wherein it comprises at least one franking machine according to claim 1 and a central server of a computerized control centers.

17. A computer communication network according to claim 16, wherein it comprises several franking machines connected to a local computer communication network, said local network being connected to the central server by an intermediate local server.

18. A franking machine according to claim 2, wherein it comprises means for calculation of inspection data adapted to authenticate the status of the accounting means.

19. A franking machine as claimed in claim 2, wherein it is adapted to store in memory a set of re-crediting codes which are adapted to enable said machine when a valid re-crediting code is transferred by the central server.

20. A franking machine as claimed in claim 3, wherein it is adapted to store in memory a set of re-crediting codes which are adapted to enable said machine when a valid re-crediting code is transferred by the central server.

21. A franking machine as claimed in claim 4, wherein it is adapted to store in memory a set of re-crediting codes which are adapted to enable said machine when a valid re-crediting code is transferred by the central server.

22. A franking machine as claimed in claim 5, wherein it is adapted to store in memory a set of re-crediting codes which are adapted to enable said machine when a valid re-crediting code is transferred by the central server.

23. A method of performing a transaction between a franking machine according to claim 2 and a central server of a computerized control center, implemented on said franking machine, wherein it comprises the following steps:
connecting the franking machine with said central server;
transferring an identifier;
disabling said franking machine;
transferring a transaction code;
performing said transaction; and
enabling the franking machine.

24. A method of performing a transaction between a franking machine according to claim 3 and a central server of a computerized control center, implemented on said franking machine, wherein it comprises the following steps:
connecting the franking machine with said central server;
transferring an identifier;
disabling said franking machine;
transferring a transaction code;
performing said transaction; and
enabling the franking machine.

25. A method of performing a transaction between a franking machine according to claim 4 and a central server of a computerized control center, implemented on said franking machine, wherein it comprises the following steps:
connecting the franking machine with said central server;
transferring an identifier;
disabling said franking machine;
transferring a transaction code;
performing said transaction; and
enabling the franking machine.

26. A method of performing a transaction between a franking machine according to claim 5 and a central server of a computerized control center, implemented on said franking machine, wherein it comprises the following steps:
connecting the franking machine with said central server;
transferring an identifier;
disabling said franking machine;
transferring a transaction code;
performing said transaction; and
enabling the franking machine.

27. A method of performing a transaction between a franking machine according to claim 6 and a central server of a computerized control center, implemented on said franking machine, wherein it comprises the following steps:
connecting the franking machine with said central server;
transferring an identifier;
disabling said franking machine;
transferring a transaction code;
performing said transaction; and
enabling the franking machine.

28. A method according to claim 9, wherein it comprises two steps of transferring inspection data, one before and the other after the transaction has been made.

29. A method according to claim 8, wherein said transaction is chosen among at least one re-crediting of the franking operation accounting means, a transfer of files forming the readings of the accounting means and a franking cycle.

30. A method according to claim 9, wherein said transaction is chosen among at least one re-crediting of the franking operation accounting means, a transfer of files forming the readings of the accounting means and a franking cycle.

31. A method according to claim 10, wherein said transaction is chosen among at least one re-crediting of the franking operation accounting means, a transfer of files forming the readings of the accounting means and a franking cycle.

32. A method of performing a transaction between a franking machine according to claim 2 and a central server of a computerized control center, implemented on the central server, wherein it comprises the following steps:
identification;
performing said transaction;
transferring re-crediting code for enabling the machine; and
disconnecting the central server from the franking machine.

33. A method of performing a transaction between a franking machine according to claim 3 and a central server of a computerized control center, implemented on the central server, wherein it comprises the following steps:
identification;
performing said transaction;
transferring a re-crediting code for enabling the machine; and disconnecting the central server from the franking machine.

34. A method of performing a transaction between a franking machine according to claim 4 and a central server of a computerized control center, implemented on the central server, wherein it comprises the following steps:
identification;
performing said transaction;
transferring a re-crediting code for enabling the machine; and
disconnecting the central server from the franking machine.

35. A method of performing a transaction between a franking machine according to claim 5 and a central server of a computerized control center, implemented on the central server, wherein it comprises the following steps:
identification;
performing said transaction;
transferring re-crediting code for enabling the machine; and
disconnecting the central server from the franking machine.

36. A method of performing a transaction between a franking machine according to claim 6 and a central server of a computerized control center, implemented on the central server, wherein it comprises the following steps:
identification;
performing said transaction;
transferring a re-crediting code for enabling the machine; and
disconnecting the central server from the franking machine.

37. A method according to claim 13, wherein
said transaction is chosen among at least one re-crediting of the franking operation accounting means, a transfer of files forming the readings of the accounting means and a franking cycle.

38. A method according to claim 14, wherein
said transaction is chosen among at least one re-crediting of the franking operation accounting means, a transfer of files forming the readings of the accounting means and a franking cycle.

39. A computer communication network, wherein
it comprises at least one franking machine according to claim 2 and a central server of a computerized control center.

40. A computer communication network, wherein
it comprises at least one franking machine according to claim 3 and a central server of a computerized control center.

41. A computer communication network, wherein
it comprises at least one franking machine according to claim 4 and a central server of a computerized control center.

42. A computer communication network, wherein
it comprises at least one franking machine according to claim 5 and a central server of a computerized control center.

43. A computer communication network, wherein
it comprises at least one franking machine according to claim 6 and a central server of a computerized control centers.

* * * * *